Nov. 13, 1956 W. L. VERVEST ET AL 2,770,136
SHAFT POSITIONING MECHANISM
Filed April 26, 1952 4 Sheets-Sheet 1
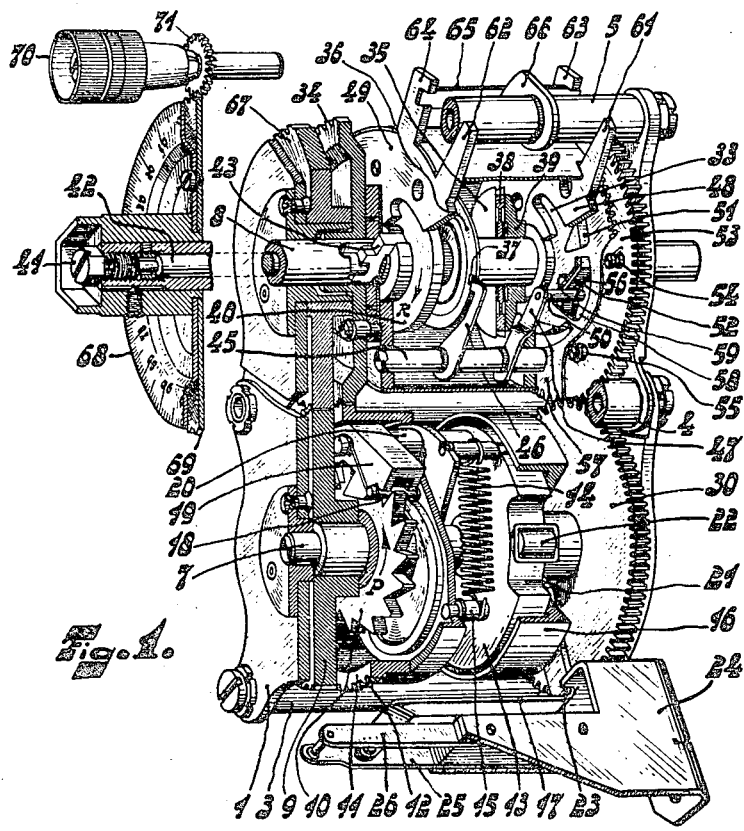
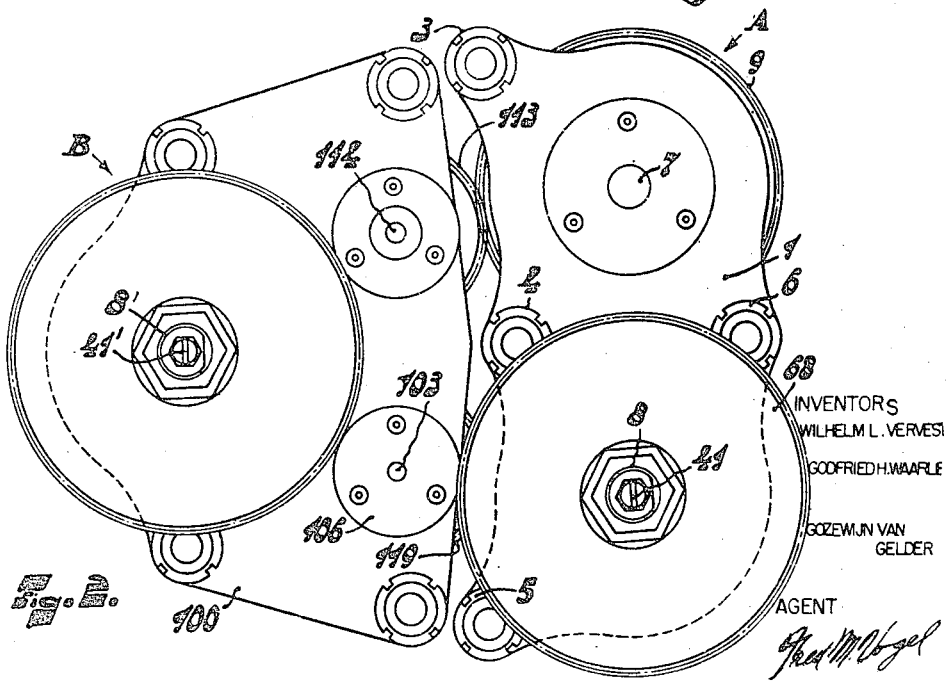
INVENTORS
WILHELM L. VERVEST
GODFRIED H. WAARLE
GOZEWIJN VAN GELDER
AGENT

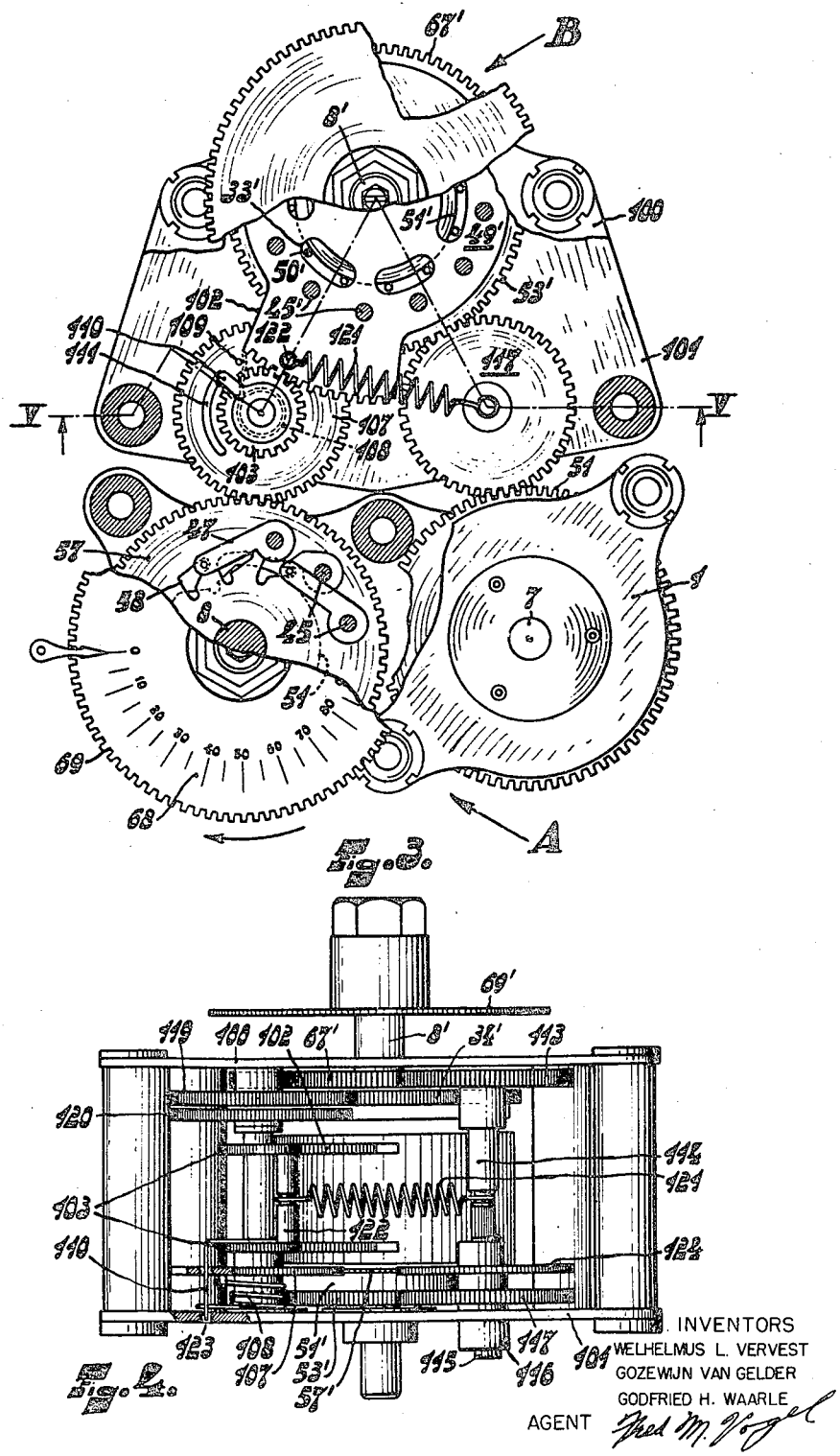

Nov. 13, 1956  W. L. VERVEST ET AL  2,770,136

SHAFT POSITIONING MECHANISM

Filed April 26, 1952  4 Sheets-Sheet 3

INVENTORS
WILHELMUS L. VERVEST
GOZEWIJN VAN GELDER
GODFRIED H. WAARLE
BY

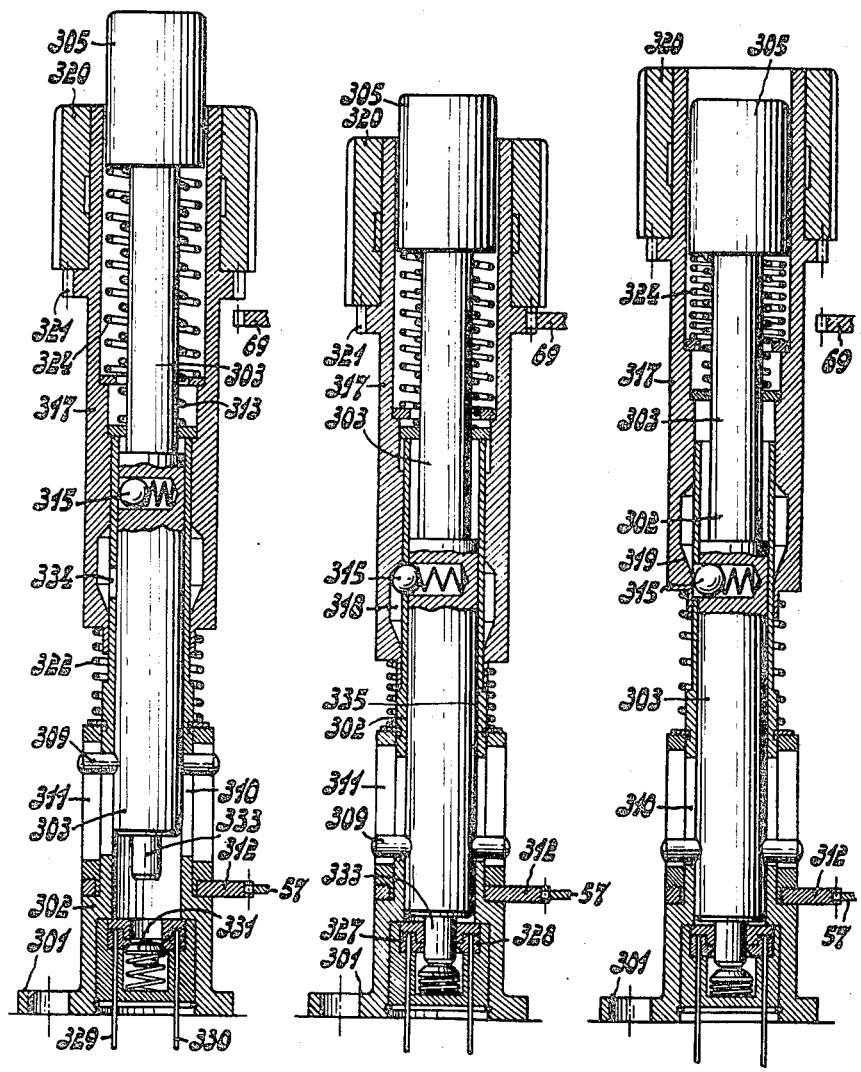

United States Patent Office

2,770,136
Patented Nov. 13, 1956

2,770,136

SHAFT POSITIONING MECHANISM

Wilhelmus Lambertus Vervest, Gozewijn van Gelder, and Godfried Hendrik Waarlé, Hilversum, Netherlands, assignors to Hartford National Bank and Trust Company, Hartford, Conn., as trustee Application April 26, 1952, Serial No. 284,672

Claims priority, application Netherlands May 9, 1951

15 Claims. (Cl. 74—10.2)

For the setting of shafts in predetermined positions, for example in radio-apparatus with remote control such as air-craft transmitters, use is sometimes made of shaft-positioning mechanisms of the locking pawl type. Such a mechanism comprises, on the shaft to be positioned, a number of adjustable stop elements adapted to co-operate each individually with pawls arranged adjacent the shaft in order to arrest the shaft in a predetermined position. As a rule such mechanisms comprise an adjustable pawl selector by means of which the pawls are each individually moved into the operative position wherein they co-operate with a corresponding stop-element on the shaft.

The present invention relates to shaft positioning mechanisms of the last-mentioned type and provides a construction which permits inter alia the shaft to be positioned to be moved by hand or other means into any desired position in a very simple manner without being hampered by the locking pawls, it being possible with the use of a mechanism, with which the locking positions must be selected within a range of adjustment of 360°, i. e. one revolution of the shaft to be positioned, to obtain a mechanism with which the locking positions may be selected at will in a range comprising more than one revolution of the shaft to be positioned. The latter is of particular importance for the setting of tuning coils comprising a sliding contact and having more than one turn.

According to the invention, a shaft-positioning mechanism is characterized in that it comprises a separately movable member co-operating with all the pawls—hereinafter termed pawl lifter—which for each pawl has such a profile that in one of two end positions, into which the pawl lifter may be urged by external means, all the pawls are maintained lifted in a constrained manner by the profile of the pawl lifter and in the other end position of the pawl lifter anyone of the pawls may be urged by the selector into its operative position without being hampered by the pawl lifter, while a displacement of the pawl lifter from the last-mentioned to the first-mentioned position causes a pawl, which may have been urged into the operative position by the selector to be moved into the inoperative position by the profile of the pawl lifter.

In any position of the shaft to be positioned and of the pawl selector, the pawl lifter permits all the pawls to be put out of operation by moving the pawl lifter from one end position into the other end position, thus establishing a state in which the shaft to be positioned can be turned, for example by hand, into any desired position without being hampered by the pawl system. The initial state is restored by moving back the pawl lifter and then the shaft to be positioned may again be arrested in the predetermined positions by means of the pawls.

The pawl lifter may be controlled by means associated with the positioning mechanisms in such a manner that after a given pawl has been selected, the pawl lifter is maintained in the position wherein all the pawls are lifted in a constrained manner until reaching a given part within a definite revolution range of the shaft to be positioned, the pawl lifter subsequently being urged into the other position so that the pawl selected by the pawl selector co-operates with the associated stop element and arrests the shaft to be positioned. In this manner the shaft positioning mechanism may be used for adjusting the shaft accurately to arbitrary positions within a range of more than one revolution of the shaft.

In a shaft positioning mechanism wherein the pawls are arranged around the shaft to be positioned and each comprise a cam-follower, which cam-followers co-operate with and are controlled by a pawl selector rotatably mounted on the shaft to be positioned, the pawl lifter preferably consists of a disc rotatably mounted on the shaft to be positioned and arranged adjacent the pawl selector. This disc is for each cam-follower furnished with a recess having a bevelled edge, with which the followers co-operate in such manner that on turning the disc the bevelled edge of the associated recess causes the cam-follower by any operative pawl to execute a radial movement so that the pawl concerned is lifted from the associated stop element.

In order that the invention may be readily carried into effect it will now be described in greater detail with reference, by way of example, to the accompanying drawing, in which Fig. 1 shows a skeletonized example of a shaft positioning mechanism according to the invention. This figure shows a constructional unit consisting of a shaft positioning mechanism and an overload coupling, through the intermediary of which the shaft to be positioned is driven.

Figures 2, 3, 4 and 5 concern a form of a shaft positioning mechanism according to the invention, which consists of a constructional unit as shown in Fig. 1 and of a second constructional unit comprising a second pawl mechanism. By means of this combination the shaft to be positioned may be arrested at will in positions of a range comprising more than one revolution of the shaft to be positioned.

Fig. 2 is a plan view of the mechanism consisting of two units, Fig. 3 also being a plan view but with parts broken away.

Fig. 4 is a side view of the constructional unit comprising the additional pawl mechanism.

Figures 6, 7, 8 and 9 relate to one form of a shaft positioning mechanism according to the invention, in which a slidable shaft operated by hand permits the pawl system to be made inoperative by means of the pawl lifter.

Figure 6:
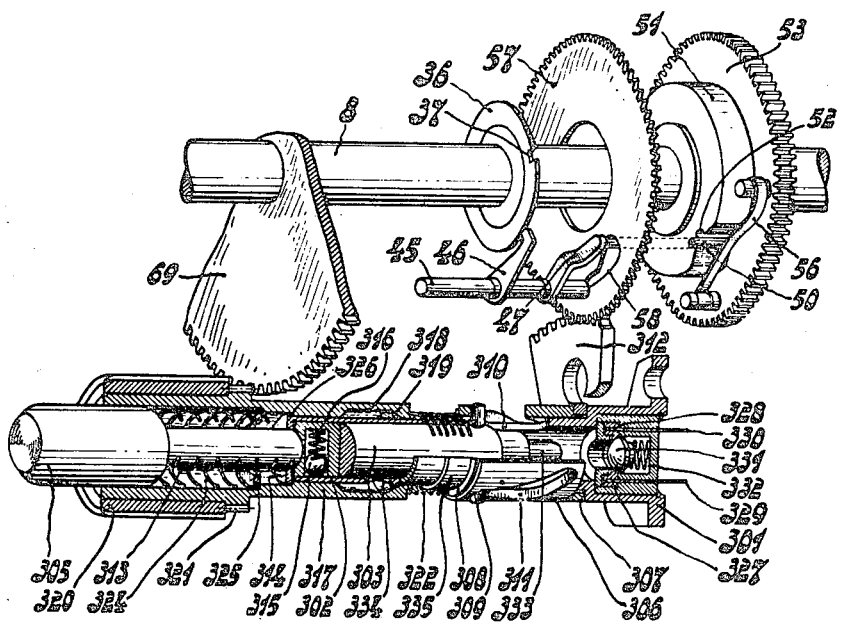

Fig. 6 shows a slidable shaft device, partly broken away, for turning the pawl lifter of a shaft positioning mechanism as shown in Fig. 1, of which mechanism only a few parts are shown.

Figs. 7, 8 and 9 show the slidable shaft mechanism depicted in Fig. 6 in its normal position, wherein the pawls are not influenced by the pawl lifter, the operated position in which all the pawls have been made inoperative by the pawl lifter, and in an intermediate position occurring when the pawl lifter has to be moved from the last position to the first position.

The shaft positioning mechanism shown in Fig. 1 comprises an overload coupling, the different parts of which are supported by a shaft 7 journalled between frame plates 1 and 2 which are secured together by crossbeams 3, 4, 5 and 6. Provided between the upper parts of the frame plates is a pawl system co-operating with stop elements fitted to a shaft 8, the shaft to be positioned, which shaft is also journalled in the two frame plates 1 and 2. The outlet of the overload coupling and the shaft 8 to be positioned are coupled in the following manner.

The overload coupling is of a type known per se from French patent specification 975,152 and comprises the following parts (in Fig. 1 from the left to the right): an inlet gear-wheel 9 with rigidly secured thereto a ratchet 10; a cup-shaped outlet gear 11 having a gear rim 12; an auxiliary member 13 which by means of two springs 14, of which only one is visible, is connected to pins 15 secured in the outlet gear 11 and a cup-shaped housing 16 enclosing the auxiliary member 13 and being provided with an arm 17. The parts 9, 11, 13 and 16 are rotatably mounted on the shaft 7. The ratchet 10 is adapted to co-operate with a pawl roller 18 supported by a pawl lever 19. This arm is rotatable about a pawl shaft 20 rigidly secured to the auxiliary member 13. The outer edge of the latter is provided with two recesses 21 of which only one is visible and each of which houses a clamping roller 22. The clamping rollers constitute a free-wheel coupling between the auxiliary member 13 and the housing 16; to this end the bottoms of the recesses 21 are inclined.

Briefly, the operation of the overload coupling is as follows. When the load of the outlet gear wheel 11 exceeds a given value which is determined by the moment exerted by springs 14, the auxiliary member 13 with pawl 19 is moved in the direction of rotation, indicated by the arrow P relatively to the outlet gear wheel 11 with the result that the pawl lever 19 is turned (in a manner not further described here) and the pawl roller 18 passes both over the radial flank of the cooperating tooth of ratchet 10 and over the sides of the arm lever 19 so that the roller eventually comes clear of the ratchet 10, thus breaking the connection between the inlet and the outlet of the coupling. In this event the auxiliary member solely sustains the force of springs 14 so that it tends to turn back, the freewheel coupling between the auxiliary member and the housing 13 then becomes operative so that the housing 16 is also moved back. However, the housing is capable of making only a limited stroke, since the arm 17 engages a recess 23 of a fixed support 24 arranged adjacent the shaft positioning mechanism. Secured to this support is an electrical contact device consisting of a movable contact 25 and a fixed contact 26. The arm 17 cooperates with the movable contact 25 so as to open the contact device due to the limited stroke executed by the housing 16 together with the auxiliary member when the latter is released from the inlet of the overload coupling. The means controlling the pawl consisting of pawl lever 19 and roller 18 are such that the pawl remains lifted despite the reduced shift in position of the auxiliary member 13 relatively to the outlet gear 11 caused by the stroke of the housing 16 after lifting the pawl. The pawl enters into the ratchet 10 only when upon a diminution of the load of the outlet gear 11 the latter is moved in the initial direction of motion by the tension of springs 14. In this event the connection between the inlet and the outlet of the coupling is automatically reestablished. The auxiliary member is again carried along in the initial direction of rotation with the result that the freewheel coupling between this member and the housing 16 becomes inoperative so that the housing and the arm 17 are allowed to resume their initial position, the contact device and contacts 25 and 26 being again closed. This contact device may, for example, be used for signalization, but it is very effective to provide this device as a switch in the energization circuit of an electric motor driving the inlet gear 9 of the coupling.

The shaft positioning mechanism proper lodged in the upper half of the space between the frame plates 1 and 2 consists of the partly hollow shaft 8 to which a member to be adjusted, for example a tuning capacitor of radio apparatus, is adapted to be coupled. Mounted on the shaft is a set of alternating friction discs 35 and stop elements 36, the latter consisting of a ring whose outer edge is provided with a recess 37. The friction discs 35, two of which are shown in Fig. 1, are rigidly secured to the shaft 8 since they are forced on its knurled surface. Furthermore, they are thin and consist of such material as to be flexible, so that the extreme parts are slightly movable in an axial direction. The stop rings 36, of which also two only are shown in the drawing are each freely rotatable about an intermediate ring 38. The set consisting of the friction discs and the stop rings is compressible in axial directions between a push member 39 secured to shaft 8 and a push member 40 displaceable in an axial direction. Due to this compression the stop rings are so clamped between the friction discs as to be fixed in the position occupied relatively to shaft 8. The clamping home of the push member 40 is effected by means of an axial screw 41 which is screwed into the hollow end of shaft 8. The push member 40 and screw 41 are displaceable in an axial direction through a push rod 42 movable in the said shaft and a bridge piece 43 passed right through the shaft and being movable in an axial direction. Around the shaft 8 are arranged twelve pawl shafts 45 each carrying a locking pawl 46 and an arm 47. The pawl shafts of which only one is visible entirely, are journalled in two supporting plates 48 and 49 rotatably mounted on shaft 8. The supporting plate 48 is furnished with a number of elongated apertures 33 through which pass pins 50, which are each connected to an arm 47 of a pawl shaft 45. The end of each pin 50 cooperates with a pawl selector consisting of circular cam 51 which is rotatable about shaft 8 and has a local depression 52 with bevelled edges. The cam 51 is fitted to the gear wheel 53 carrying two pins 54 and 55. Both pins are interconnected by a curved wire spring 56, the centre of which extends above the depression 52. The gear wheel 53 of the pawl selector is coupled to a gear wheel 30 freely rotatable about the shaft 7 which also carries various parts of the overload coupling. Arranged between the supporting plate 48 and the cam 51 is a pawl lifter 57 which is freely rotatable on shaft 8 and consists of a thin tooth disc furnished with a recess 58 for each pin 50. Each recess has a bevelled edge 59 adapted to cooperate with the pin 50 passing through the recess concerned.

In each selecting position of the pawl selector the depression 52 is moved below one of the pins 50, the spring 56 engaging this pin in a radial direction, the associated locking pawl thus being made to co-operate with the edge of the corresponding stop ring on shaft 8. The pawls 46 are relatively spaced in an axial direction so that each pawl is able to co-operate with a given stop ring. For driving the shaft 8 it carries a gear wheel 34 which meshes with the tooth rim 12 of the outlet part 11 of the overload coupling.

If by way of the overload coupling and the gear wheel 34 the shaft 8 to be positioned is rotated in the direction of the arrow R, the recess 37 will at a given instant reach the end of the locking pawl 46 made operative by the pawl selector, so that the pawl snaps in and arrests shaft 8, the overload coupling thus being thrown out. The position in which shaft 8 is locked is determined by the angular position of the recess 37 of the stop ring concerned relatively to shaft 8. This angular position is adjustable at will for each individual stop ring after removal of the axial pressure exerted on the set consisting of friction discs 37 and stop rings 36.

For arresting the shaft 8 in a position determined by another stop ring, the pawl selector is so turned as to select the locking pawl associated with the said stop ring, since the depression 52 of the selecting cam 51 is moved below the pin 50 concerned. In this case the previously operated locking pawl is first lifted, since the pin 50 associated with this pawl is radially urged outwards by the sloping side of the depression 52. The unselected pawls are maintained in lifted position by the cam 51 and solely the pawl whose arm is above the depression 52 is able to cooperate with a stop ring on shaft 8.

In the illustrated position of the pawl lifter 57, all the pins 50 are at a location in the recesses 58 where the latter are sufficiently wide not to hamper a movement of these pins commanded by the pawl selector. By turning the pawl lifter in the direction of rotation R of shaft 8 this becomes different and all the pins enter into a narrowed part of the recesses, which part extends so far from the centre of shaft 8 as to prevent the pawl associated with a pin in this narrow part from co-operating with its stop ring on shaft 8. The sloping edge 59 of the recesses lifts, upon this rotation of disc 57, any pawl urged into the operative position by the pawl selector, since the pin concerned mounts the edge 59. In the new position of the pawl lifter, the shaft 8 may be moved into any desired position without being hampered by the locking pawls. The initial situation is restored by turning back the pawl lifter 57 so that the shaft 8 can again be arrested by a locking pawl selected at will.

The shock caused by the pawl on the arresting shaft 8 is taken up as follows. The two supporting plates 48 and 49 comprise projecting parts 63 and 64 respectively in which are secured the ends of a multipart plate spring 65 extending parallel to shaft 8. This plate spring co-operates at its centre with the edge of an eccentric cam 66 secured to the cross beam 5. The two supporting plates are maintained with cams 61 and 62 respectively against the cross beam 5 under the action of plate spring 65. On arresting shaft 8 by means of anyone of the locking pawls 46 the shock is automatically taken up since the aggregate consisting of supporting plates 48, 49 and pawl shafts fitted thereto are carried along in the direction of rotation R against the action of plate spring 65, the overload coupling being disengaged due to the load then occurring. As soon as the shaft 8 comes to a standstill, the said aggregate together with shaft 8 and the members coupled thereto are turned back by the plate spring until the two stops 61 and 62 again rest against the cross beam 5. The spring force of plate spring 65 is adjustable by turning the cross beam 5.

On the shaft 8 is furthermore rotatably mounted a gear wheel 67 which meshes with the inlet gear 9 of the overload coupling. The coupled gears 9, 67 and 53, 30 permit the driving means of the overload coupling and the pawl selector to be arranged at will on either side of the said constructional unit.

The drawing shows a scale 68 associated with a gear wheel 69 fitted to shaft 8. For manual adjustment of shaft 8 a pinion 71 secured to a fine control knob 70 may be made to co-operate with gear wheel 69 by axial displacement of the said knob.

Figure 5:
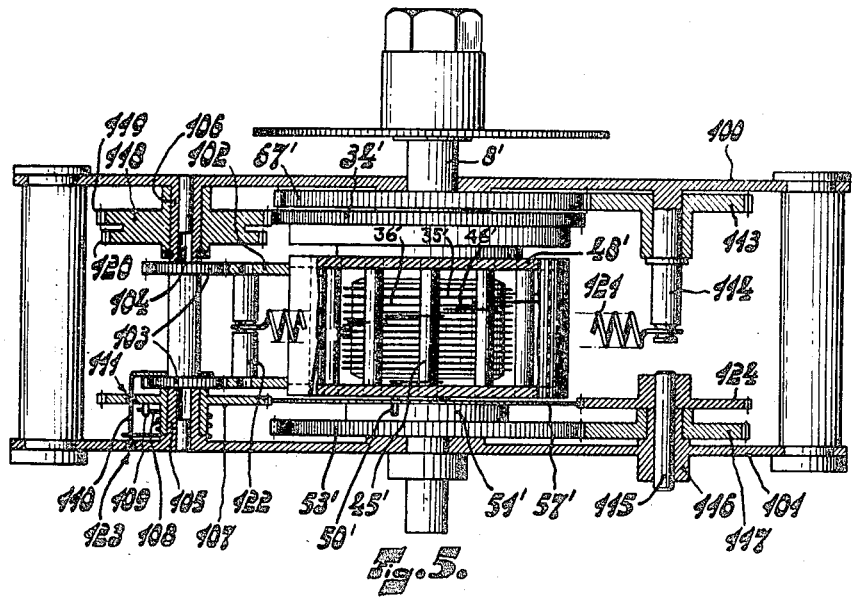
Fig. 5 is a cross-section on the line V—V in Fig. 3.

Figures 2 to 5 show a shaft positioning mechanism by means of which the shaft to be positioned may be arrested at will in predetermined positions within a range comprising more than one revolution of the shaft to be positioned. The mechanism consists of a constructional unit A similar to the mechanism depicted in Fig. 1, to which is coupled a second constructional unit B also comprising a locking pawl mechanism. The latter comprises substantially the same elements as the mechanism shown in Fig. 1 and corresponding to the unit A. Hence, these elements of the unit B bear the same reference numerals as used for corresponding elements shown in Fig. 1, but they are distinguished by an accent. As shown in Fig. 5, the unit B comprises a shaft 8' which is supported in two parallel frame plates 100 and 101 and corresponds to shaft 8 of the unit A. On this shaft 8' is mounted a set of alternating friction discs 35' and adjustable stop rings 36'. The shaft 8' with its set of friction discs and stop rings will hereinafter be termed the auxiliary rotor. Pawls 46' each supported by a pawl shaft 45' are able to co-operate selectively with the said stop rings under the control of a pawl selector 51'. The pawl shafts 45' are arranged in a circle around shaft 8' and fitted to their bearings in the two supporting plates 48' and 49', which are rotatable about the shaft 8'. These two plates each comprise a projecting part 102 provided with teeth at its edge. These teeth mesh with two interconnected gears 103 rotatably mounted on a spindle 104 supported in two bearing bushes 105 and 106 respectively secured to frame plates 100 and 101. The bearing bush 105 (Fig. 5) carries a gear wheel 107 which meshes with the tooth rim of the pawl lifter 57 of unit A (Fig. 3). The gears 103 and 107 are intercoupled through a helical spring 108 acting on pin 109 secured to the gear 107 and on the downwardly bent arm 110 which is secured to the gear wheel 103 and passes through a tangential slot 111 of gear wheel 107 (Figs. 3, 4 and 5).

The unit B furthermore comprises a tooth gear 113 which is rotatably mounted on a shaft 114 carried on plate 100 and meshing with a gear wheel 67' which is freely rotatable about shaft 8'. On the other hand gear wheel 113 couples with gear wheel 9 and have gear wheel 67 on the shaft 8 to be positioned of unit A owing to the relative positioning of units A and B.

The lower plate 101 carries a shaft 115 which is secured in a bush 116 carrying a gear wheel 117 which on the one hand meshes with the pawl selector gear wheel 53' of unit B and on the other hand is coupled through gear wheel 30 with the pawl selector gear wheel 53 of unit A. The two pawl selectors are coupled thereby in such manner that both of them select a pawl of their unit simultaneously. Since both units comprise an equal number of pawls to be selected each pawl in one unit has a corresponding pawl in the other unit, which pawls are invariably selected simultaneously.

The shafts 8 and 8' are so coupled in their movement as to occupy simultaneously their initial angular positions every time after a given number of revolutions. In the present embodiment this coupling is established by means of a gear wheel 118 (Fig. 5) having two gear rims 119 and 120 respectively and bearing on a bush 106 which also supports the upper end of shaft 104. The gear rim 119 meshes with the tooth gear 34' rigidly secured to shaft 8', tooth rim 120 meshing with the tooth gear 34 secured to shaft 8 of unit A.

By a judicious choice of the ratio of the number of teeth of the rims 119 and 120 the initial angular relations of shafts 8 and 8' may be obtained simultaneously after a given number of revolutions. For example, if this is to be ensured for fourteen revolutions of shaft 8 the transmission ratio between shafts 8 and 8' may be 14:13, 14:15 or 14:1. As a rule one of the first two ratios will be chosen.

The complete mechanism operates as follows.

Upon driving one of the pawl selector gear wheels 53 and 53' a given pawl is selected both in unit A and in unit B. In unit B the selector pawl chosen is made to cooperate with the corresponding stop ring on shaft 8'. In unit A this is not the case since under the action of spring 121 the pawl lifter 57 is maintained, by the coupling through gear wheels 107, 103 to the supporting plates 48', 49' of unit B, in that position wherein none of the pawls 46 arranged about the shaft 8 to be positioned is able to cooperate with a stop ring on the said shaft. By the spring acting at one end on pin 114 and at the other end on a pin 122 interconnecting the two projections 102 of plates 48' and 49' the frame constituted by the said plates is maintained in an extreme position opposite to the direction of rotation of shaft 8', this position depending upon the freedom of motion of arm 110 in a recess 123 of frame plate 101.

When on driving the coupled shafts 8 and 8' through the overload coupling in unit A the recess in the stop ring co-operating with pawl 46' selected in unit B reaches this pawl the latter snaps in and on further rotation of the two shafts the assembly consisting of pawl shafts 45' and plates 48', 49' is carried along in the direction of rotation of shaft 8' in a manner corresponding to that in which the shock on arresting shaft 8 is taken up in the device shown in Fig. 1. However, the load thus produced by spring 121 must not release the overload coupling of unit A. The displacement of the said assembly results in that the pawl lifter 57 of unit A is also turned (in Fig. 3 in a clockwise direction) through the flexibly coupled gears 103, 107 as to permit the pawl selected in unit A to co-operate with its corresponding stop ring and consequently arrests the shaft 8 when the recess of this stop ring reaches the end of the pawl.

If the shaft 8 is not soon arrested, the assembly comprising the pawl shafts in unit B will be carried along until, due to the displacement of pin 50' associated with the selected pawl past the local depression in cam 51' of the pawl selector of unit B, the pawl is lifted so that the coupling between the assembly and shaft 8' is released, the assembly then resuming its initial position under the action of spring 121 with the result that the pawl lifter 57 of unit A is also caused to resume its initial position wherein none of the locking pawls of unit A is operative. Shaft 8 is arrested only when the pawl selected in unit B enters into the recess of its corresponding stop ring and the recess of the stop ring co-operating with the then operative selected pawl of unit A at the same time reaches the end of this pawl. Due to this manner of coupling of the two shafts 8 and 8' this situation occurs only once in a range of a given number of revolutions, which number is determined by the transmission ratio of shafts 8 and 8'.

The flexible coupling between the gears 103 and 107 through spring 108 and catch 110 in the slot 111 has for its purpose to permit the assembly comprising the pawls of unit B to be carried along by shaft 8' further than is necessary for moving the pawl lifter of unit A into the position wherein the pawls 46 are no longer hampered. As a matter of fact the auxiliary rotor must be able to run on in order to lift the operative pawl of unit B if the pawl selected in unit A is not reached in time by the recess of the associated stop ring.

The position in which shaft 8 is arrested by means of pawl 46, is determined by the angular relation of the stop ring on shaft 8 corresponding to the said pawl and the angular relation of the stop ring on the auxiliary rotor co-operating with the simultaneously selected pawl of unit B. Preadjustment of this position is effected by removing from the stop ring set on shaft 8 as well as that on shaft 8' the thrust fixing the stop rings in the position occupied by them relatively to that shaft and by causing the two simultaneously selected pawls to enter into the recess of the corresponding stop rings. To this end it is necessary for the assembly comprising the pawls of unit B to be turned by external means, for example, by hand, to such a degree against the action of springs 121 as to urge the pawl lifter 57 of unit A into the position wherein none of the pawls 46 is hampered any longer. When both pawls are in the operative position the shaft 8 is brought into the desired position (automatically selected later) the stop rings co-operating with the selected pawls being subsequently locked by axial pressure in the angular position then occupied with respect to the shafts. This may be effected for each individual stop ring associated with each pair of simultaneously selected pawls of units A and B.

The gear wheel 67' coupled through gear wheels 113 and 9 to gear wheel 67 of unit A is provided in order that the driving means for the shaft to be positioned may also be coupled laterally of unit B without the need for additional transmission means to the inlet of the overload coupling of unit A.

Similarly to the unit A, the unit B is equipped with a pawl lifter in the form of a gear wheel 57' which is furnished with openings for the pins 50' and meshes with a gear wheel 124 rotatable about shaft 115 (Fig. 5). By turning the pawl lifter 57' from its normal position, wherein the pawls 46' of unit B are not influenced by it, into the operative position wherein all the pawls 46' are lifted in a constrained manner, a state results in which the shaft 8 to be positioned may be given any desired position without being hampered by the pawls 46 of unit A.

The mechanism set out with reference to Figures 2 to 5 is particularly suitable for the adjustment of coils comprising a sliding contact and more than one turn, it then being possible either for the arm with the sliding contact or the coil itself to be driven by shaft 8. Owing to the shape of the recesses of stop rings 36, the construction of the assembly carrying the pawl shafts of unit B and the construction of the overload coupling the shaft 8 is able to rotate continuously only in one direction. In the embodiment as described it is therefore desirable that a reversing mechanism reversing the motion of the movable member periodically should be provided between the shaft 8 and the movable member of the slide coil, or the coil should be so constructed that on reaching its end the sliding contact is automatically returned to the beginning of the coil.

With reference to Figures 6, 7, 8 and 9 it will now be explained how a slidable shaft system permits in a simple manner the pawl lifter of a unit as shown in Fig. 1 to be urged from the operative position into the inoperative position, and conversely. The slidable shaft system consists of a constructional unit which is arranged separately adjacent the mechanism shown in Fig. 1. Fig. 6 shows the construction of this unit and its co-operation with a mechanism as shown in Fig. 1. Of the last-mentioned mechanism only those parts are diagrammatically represented which are of importance for understanding the following. Figures 7, 8 and 9 illustrate for a better view several states of the slidable shaft system.

Adjacent the shaft positioning mechanism shown in Fig. 1 is arranged a hollow base 301 to which is secured a cylindrical guide 302 for a slidable shaft 303 comprising a hand-operated knob 305. A bush 306 enclosed between a shoulder 307 and a ring 308 is rotatable about the lower end of guide 302. Fitted in the slidable shaft 303 is a transverse pin 309 which extends into the guide 302 through two diametrical slit-shaped apertures 310 extending in an axial direction. The bush 306 is also provided with slit-shaped apertures 311 for a pin 309, but these apertures are helical. A displacement of the slidable shaft 303 in an axial direction results in a rotation of bush 306, which rotation is transmitted to the pawl lifter through a pinion 312 which is secured to bush 306 and meshes with the gear rim of the pawl lifter 57 of the shaft positioning mechanism proper. By means of a helical spring 313 enclosed between the bottom of head 305 and a ring 314 resting on the end of the guide bush 302 the slidable shaft 303 is urged away from the base 301. The part of the slidable shaft 303 extending into the guide 302 has a transverse aperture engaged by a ball 315 which is urged outwards by a spring 316. Around the end of bush 302 is slidable and rotatable a bush 317 which is furnished with an internal cylindrical recess 318 having a bevelled edge 319 and is externally provided with a head 320 and a gear rim 321. The bush 317 is subjected to two opposed spring forces, one of them exerted by a helical spring 322 enclosed between a shoulder 323 of bush 317 and ring 308 and the other by a helical spring 324 acting between the bottom of the head 305 and a ring 325 internally resting on bush 317. In the state illustrated in Figures 6 and 7 the tension of spring 322 is predominating so as to maintain the bush 317 with a shoulder 326 against the ring 314.

The base 301 contains an electric switch comprising two substantially semi-circular fixed contacts 327, 328 and a movable contact 331 which is maintained by a helical spring 332 against the fixed contacts 327, 328 and connects them electrically. Contact 331 is adapted to cooperate with the thinner end 333 of the slidable shaft 303. This device operates as follows.

The slidable shaft 303 is normally in the position depicted in Figures 6 and 7, in which the bush 306 occupies such a position that the pawl lifter 57 of the shaft positioning mechanism proper is so turned that the locking pawls 46 are not hampered by the pawl lifter 57. Hence, the shaft 8 can be arrested in predetermined positions by means of the pawls 46. The pinion 312 is rotated by depressing the knob 305 so that the slidable shaft is displaced in a longitudinal direction, the pawl lifter 57 thus being moved into its operative position wherein all the pawls of the positioning mechanism are lifted in a constrained manner so that the shaft 8 may be manually given any desired position. The slidable shaft is arrested in the depressed position, since the ball 315 enters into an aperture 334 of guide 302 and engages the wall of the cavity 318 of bush 317, the centre of the ball being located substantially at the centre of the aperture 334 so that the slidable shaft cannot return. By depressing the knob 305 the spring 324 is additionally stretched so that it is able to overcome the counter-force of spring 322. In this manner the bush 317 is caused to follow the slidable shaft 303 until it abuts against the shoulder 335 of the guide 302. By this displacement of bush 317 the gear rim 321 is caused to mesh with the gear wheel 69 fitted to shaft 8 of the positioning mechanism proper so that the knob 320 may now act as a fine control knob for the said shaft. Upon depression of the slidable shaft 303 its thinner end 333 moreover forces the movable contact 331 of the switch in the base 301 away from the fixed contacts 327, 328 thus interrupting the electrical connection between the conductors 329, 330 connected to the said contacts. This state is shown in Fig. 8. The switch in the base 301 is provided, in series with the contact device 23, 24 operated by the arm 17 of the overload coupling of the positioning mechanism proper (Fig. 1) in the electric circuit of the driving electric motor (not shown) for the complete mechanism. The function of this switch is to prevent the driving motor from being started upon depression of the slidable shaft due to which the locking of shaft 8 by means of a pawl is released, so that the overload coupling is automatically established.

In order to cause the mechanism to resume the state in which the shaft 8 is arrested in a predetermined position by means of a pawl selected by the pawl selector, the bush 317 is moved to its initial position by pulling the knob 320 so that the spring 313 is strongly stretched and at the same time the ball 315 is forced inwards by the bevelled edge 319 of the cavity 318. At the same time the gear rim 321 comes clear of the gear wheel 69 on the shaft 8. This state is shown in Fig. 9 and is a state of transition, since due to depression of the ball 315 it so engages the edge of the aperture 334 as to no longer arrest the slidable shaft 303 effectively; hence the spring 313 causes the slidable shaft to resume its initial position by pushing it back in an axial direction. The bush 306 and consequently the pawl lifter 57 are turned back to the position wherein the arms 50 associated with the locking pawls of the positioning mechanism proper are in the wide parts of the recesses 58 of the pawl lifter, the initial state thus being restored. Since, upon the return of the slidable shaft, the movable contact 331 re-establishes the electrical connection between the guides 329 and 330 the driving motor is started and the shaft 8 to be positioned will be rotated until the pawl chosen by the pawl selector arrests this shaft, the overload coupling subsequently being released.

It is to be noted that in the device described with reference to Figures 2 to 5 a slidable shaft unit may be arranged adjacent the unit B to co-operate with the pawl lifter 57' in the last-mentioned unit. The advantage of the described construction of the slidable shaft unit is that it is assembled to form a constructional unit which may at will be added to shaft positioning mechanisms comprising a pawl lifter according to the invention.

What we claim is:

1. A shaft positioning mechanism of the locking pawl type comprising a rotatable shaft to be positioned, a plurality of individually adjustable stop elements mounted on said shaft, a plurality of pawl shafts circularly arranged around said rotatable shaft, each of said pawl shafts having a pivotally mounted locking pawl, pawl selector means for each of said pawls in order to enable each of said pawls to co-act individually with a corresponding individual stop element thereby arresting said rotatable shaft in a predetermined position, said pawl selector means comprising a pawl lifter, a pawl arm and a cam member, external means operatively co-acting with said pawls by moving said pawl lifter, pawl arm and cam member, said pawl lifter having a certain profile for each pawl so that in one of at least two positions into which said pawl lifter may be moved by said external means all said pawls are maintained in a lifted, inoperative position by said profile, and in the other position any one of said pawls may be moved into operative position in engagement with a corresponding stop element.

2. A shaft positioning mechanism as set forth in claim 1 further comprising means controlled in accordance with said pawl selector means, said means including a member coupled to said rotatable shaft which after a predetermined number of revolutions both said shaft to be positioned and said member simultaneously assume the initial position in such a manner that the pawl selected by said pawl selector is released by said pawl lifter for engaging and locking said rotatable shaft to be positioned when said rotatable shaft and said member simultaneously occupy said initial position.

3. A shaft positioning mechanism as set forth in claim 1 further comprising an auxiliary rotatable shaft, a second plurality of pawls associated with said auxiliary shaft and arranged circularly around said auxiliary shaft and a second pawl selector rotatably mounted on said auxiliary shaft for causing said second plurality of pawls to be made selectively operable and coupled to said pawl selector for said pawls associated with said shaft to be positioned.

4. A shaft positioning mechanism as set forth in claim 1 further comprising a slidable shaft being adjustable in a longitudinal direction for displacing said pawl lifter.

5. A shaft positioning mechanism as set forth in claim 1 wherein said pawl lifter is a toothed wheel, a sliding shaft, a rotatable bushing, a pinion connected to said bushing, and said bushing and pinion being mounted on said sliding shaft for driving said pawl lifter.

6. A shaft positioning mechanism as set forth in claim 1 further comprising a sliding shaft being adjustable in a longitudinal direction for displacing said pawl lifter, a stationary hollow guide being provided with an aperture and supporting said sliding shaft, said sliding shaft being provided with a radial cavity, a spring-pressed ball in said radial cavity, and in one position of said sliding shaft said ball being urged into said aperture in the stationary hollow guide to thereby arrest said sliding shaft.

7. A shaft positioning mechanism as set forth in claim 1 further comprising a sliding shaft being adjustable in a longitudinal direction for displacing said pawl lifter, a stationary hollow guide being provided with an aperture and supporting said sliding shaft, said sliding shaft being provided with a radial cavity, a spring-pressed ball in said radial cavity, and in one position of said sliding shaft said ball being urged into said aperture in the stationary hollow guide to thereby arrest said sliding shaft, a rotatable bushing on said sliding shaft surrounding said hollow guide and being provided with an internal cavity partly receiving said ball, said cavity having a bevelled bottom portion whereby upon displacement of said bushing relatively to said hollow guide said ball is engaged by said bevelled portion to thereby release said sliding shaft.

8. A shaft positioning mechanism as set forth in claim 1 further comprising a slidable shaft being adjustable in a longitudinal direction for displacing said pawl lifter, and an electrical contact device, said slidable shaft co-acting with said electrical contact device to operate said electrical contact upon longitudinal displacement of said slidable shaft.

9. A shaft positioning mechanism of the locking pawl type comprising a rotatable shaft to be positioned, a plurality of individually adjustable stop elements mounted on said shaft, a plurality of pawl shafts circularly arranged around said rotatable shaft, each of said pawl shafts having a pivotally mounted locking pawl and a cam follower, pawl selector means for each of said pawls in order to enable each of said pawls to co-act individually with a corresponding individual stop element thereby arresting said rotatable shaft in a predetermined position, said pawl selector means comprising a pawl arm, a cam member and a pawl lifter, external means for moving said pawl selector means, said pawl lifter being a disc mounted on said rotatable shaft adjacent said cam member and having a certain profile for each pawl so that in one of at least two positions into which said pawl lifter may be moved by said external means all said pawls are maintained in a lifted, inoperative position by said profile, and in the other position any one of said pawls may be moved into operative position in engagement with a corresponding stop element, and said disc being provided with a recess having a bevelled edge adapted to move said cam follower upon the displacement of said pawl lifter to said position wherein all the pawls are maintained in said lifted, inoperative position thereby releasing one of said pawls from engagement with its corresponding stop element.

10. A shaft positioning mechanism as set forth in claim 9 further comprising an automatically-operating overload coupling through which said rotatable shaft is driven ensuring that said shaft is not loaded above the maximum load of said overload coupling.

11. A shaft positioning mechanism as set forth in claim 9 further comprising a gear, and a resilient coupling operatively connecting said gear to said pawl lifter, said coupling permitting a displacement of said gear not exceeding the displacement required for displacing said pawl lifter.

12. A shaft positioning mechanism as set forth in claim 9 further comprising an auxiliary rotatable shaft, a second plurality of pawls associated with said auxiliary shaft and arranged circularly around said auxiliary shaft, a pair of parallel plates rotatably mounted on said auxiliary shaft and having said second plurality of pawls therebetween, and a spring subjecting said second plurality of pawls to a torque acting in a direction opposite to the direction of rotation of said auxiliary shaft.

13. A shaft positioning mechanism as set forth in claim 9 further comprising an auxiliary rotatable shaft, a second plurality of pawls associated with said auxiliary shaft and arranged circularly around said auxiliary shaft, and a second pawl lifter being adapted to move said second plurality of pawls into an inoperative position.

14. A shaft positioning mechanism as set forth in claim 9 further comprising an auxiliary rotatable shaft, a second plurality of pawls associated with said auxiliary shaft and arranged circularly around said auxiliary shaft, a second pawl lifter being adapted to move said second plurality of pawls into an inoperative position, and a slidable shaft being adjustable in a longitudinal direction for displacing said second pawl lifter.

15. A shaft positioning mechanism as set forth in claim 9 further comprising a sliding shaft being adjustable in a longitudinal direction for displacing said pawl lifter, a stationary hollow guide being provided with an aperture and supporting said sliding shaft, said sliding shaft being provided with a radial cavity, a spring-pressed ball in said radial cavity and in one position of said sliding shaft said ball being urged into said aperture in the stationary hollow guide to thereby arrest said sliding shaft, a rotatable bushing having a pinion connected thereto on said sliding shaft, spring means coupling said sliding shaft to said bushing, said spring means being stretched so that said bushing is carried along in the direction of movement of said sliding shaft when said sliding shaft is in a predetermined position.

References Cited in the file of this patent

UNITED STATES PATENTS

| | | |
|---|---|---|
| 2,530,795 | Unk | Nov. 21, 1950 |
| 2,547,184 | Vervest | Apr. 3, 1951 |